No. 711,032. Patented Oct. 14, 1902.
J. AHRENDS.
FEED TROUGH.
(Application filed Apr. 23, 1902.)
(No Model.)
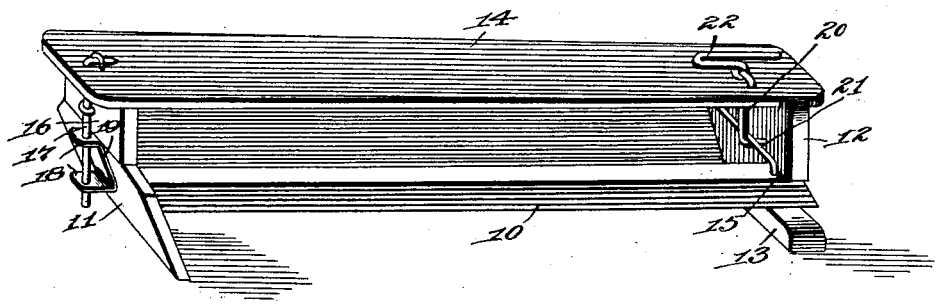
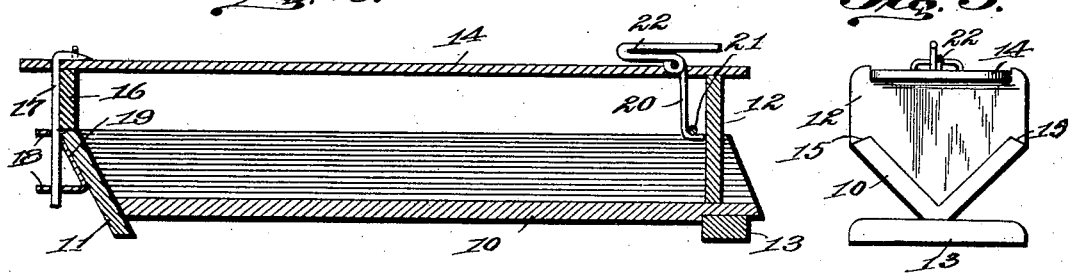 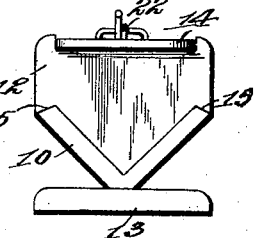
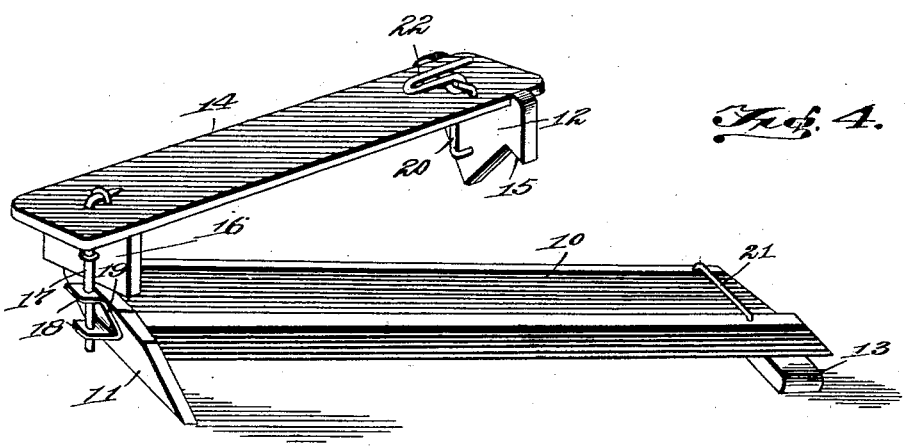
John Ahrends Inventor
Witnesses
John Maupin
B. F. Foster
By _____ Attorney

UNITED STATES PATENT OFFICE.

JOHN AHRENDS, OF DEARBORN COUNTY, INDIANA.

FEED-TROUGH.

SPECIFICATION forming part of Letters Patent No. 711,032, dated October 14, 1902.

Application filed April 23, 1902. Serial No. 104,306. (No model.)

*To all whom it may concern:*

Be it known that I, JOHN AHRENDS, a citizen of the United States, residing near Sunman post-office, in the county of Dearborn and State of Indiana, have invented a new and useful Feed-Trough, of which the following is a specification.

The present invention relates to feed-troughs, and while particularly intended for use in feeding poultry it will be evident when the invention is understood that it may be as readily employed for swine or other animals.

The object of the invention is to provide a trough which while permitting of access to the feed placed therein will prevent the animals from standing in the trough, said trough being so constructed that it may be readily and thoroughly cleansed.

The preferred embodiment of the invention is fully illustrated in the accompanying drawings, wherein—

Figure 1 is a perspective view of the improved trough. Fig. 2 is a longitudinal sectional view through the same. Fig. 3 is a view in elevation of one end of the trough, and Fig. 4 is a perspective view with the cover moved to one side.

Similar numerals of reference designate corresponding parts in all the figures of the drawings.

In this embodiment of the invention the trough is of substantially the ordinary shape, comprising converging bottom walls 10 and end walls 11 and 12, the end wall 11 being secured to one end of the bottom and also constituting a support for the trough. Another support 13 is secured to the opposite end of the bottom. Located above and in spaced relation to the trough is a cover 14, to one end of which is secured the end wall 12, that removably fits within one end of the trough and conforms to the shape thereof, as shown in Fig. 3, this end wall being provided with supporting portions 15, that engage the opposite upper edges of the bottom. The other end of the cover carries a spacing-block 16, that rests upon the upper edge of the end wall 11. An upright pivot-pin 17 is secured to this end of the top or cover and is journaled in alined ears 18, secured to the end wall 11, said ears being preferably formed by the outstanding terminals of a single metal plate 19, the intermediate portion of which is fastened to the end wall. The end of the cover 14, which carries the removable end wall 12, is also provided with a depending pivot-hook 20, that detachably engages over a holding bar or rod 21, secured across the end of the trough, said hook passing through the cover and having at its upper end a suitable handle portion 22.

In use the food is placed within the trough and the cover locked over the same. Animals may therefore have access to the food; but they cannot stand within the trough as the space between the cover and edges of the bottom wall only permit the insertion of their heads. The food can thus be kept in better condition and will not be wasted. When it is desired to cleanse the trough, it is only necessary to unlatch the free end of the same and turn the cover to one side, whereupon the entire interior is disclosed and one end of the trough is freely open, so that everything may be washed or brushed through said end. It will thus be seen that an exceedingly simple structure is provided which will prevent the wasting of the food and which may be kept in a thoroughly sanitary condition.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a feeder of the class described, the combination with a trough, a cover movably mounted over the trough and located in spaced relation thereto, a bar extending across and secured to the trough, and a latch carried by the cover and engaging the crossbar to hold said cover against movement.

2. In a feeder of the class described, the combination with a trough, of a cover movably mounted over the trough, the ends of said trough constituting a support for the cover, a bar extending across and secured to the trough contiguous to the inner face of one of the end walls, and a latch pivoted upon the cover and engaging the cross-bar to hold said cover against movement.

3. In a feeder of the class described, the combination with a trough, of a cover located above and spaced from the trough, an upright pivot connecting one end of the cover and trough to permit a lateral swinging movement of the former, and a latch pivoted upon the free end of the cover and having a detachable engagement with the trough to hold said cover against movement thereon.

4. A feed-trough having a bottom and end walls, one of said end walls being removably mounted upon the trough.

5. In a feeder of the class described, the combination with a trough, of a cover removably mounted upon the trough, and a wall for the trough secured to the cover and removable therewith.

6. In a feeder of the class described, the combination with a feed-trough, of a cover pivotally mounted upon the trough, and a wall for the trough secured to the cover and movable therewith.

7. In a feeder of the class described, the combination with a trough, of a cover pivotally mounted at one end to the trough, and an end wall for the trough removably mounted thereon and secured to the free end of the cover.

8. In a device of the class described, the combination with a trough having one end open and the other end closed, of the cover pivotally mounted at the closed end of the trough and extending longitudinally over the trough, and a wall carried by the cover and adapted to form a removable closure for the open end of the trough.

In testimony that I claim the foregoing as my own I have hereto affixed my signature in the presence of two witnesses.

JOHN AHRENDS.

Witnesses:
JOHN COSS,
FRED COSS.